April 4, 1944.  J. F. LINCOLN ET AL  2,345,758

ARC WELDING

Filed April 21, 1942

INVENTORS
JAMES F. LINCOLN and
THEOPHIL E. JERABEK

BY *Oberlin, Limbach & Day*

ATTORNEYS

Patented Apr. 4, 1944

2,345,758

UNITED STATES PATENT OFFICE 2,345,758

ARC WELDING

James F. Lincoln, Cleveland, and Theophil E. Jerabek, East Cleveland, Ohio, assignors to The Lincoln Electric Company, Cleveland, Ohio, a corporation of Ohio Application April 21, 1942, Serial No. 439,840

3 Claims. (Cl. 219—10)

This invention relates as indicated to arc welding in the broad sense that it relates to the electrodeposition of metals whether employed for the express purpose of joining parts together or for applying metal to parts in the nature of a surfacing operation.

More particularly, this invention relates to an improved method of welding and an electrode designed especially for use in such method, characterized by the fact that the same operates at a greater efficiency than any of the processes of the prior art.

The efficiency of the welding operation in the sense that such term is used in the description of this invention may be expressed in terms of the amount of heat or energy required to lay down or melt a given amount of metal.

The heat generated by the welding arc may be divided into the "used" component and the "wasted" component.

The "used" component is utilized for the purpose of:

(a) Melting a portion of the base metal, i. e. a portion of the work being welded or onto which the weld metal is being deposited;

(b) Melting the electrode; and (c) Melting the slag-forming constituents of the coating usually employed on the fusible weld-rod for the purpose of protecting the weld metal deposited under the arc.

The "wasted" component is dissipated in a number of ways, among which the following may be mentioned:

(a) In super-heating the molten metal under the arc, that is, in heating such metal to its boiling point and causing some of the same to be vaporized and lost; and (b) By radiation through a variety of channels.

The foregoing will perhaps be more readily understandable if we analyze, for a moment, the nature of the welding operation utilizing a fusible metallic electrode. In order for an arc to be maintained between a fusible electrode and the work it is necessary that there be maintained an ionized column or path between the electrode and the work, and it is generally recognized that the temperature of such path or arc stream may be conveniently expressed as being the boiling point of the metal comprising the electrode. All of the metal melted off from the end of the electrode is, therefore, raised to this superheated condition. In other words, its temperature is raised far above that temperature at which the deposited metal is required to be maintained in order that it may coalesce with the work.

Of course, the extremely high temperatures of the arc cannot be avoided since it is necessary that such temperatures be achieved in order to maintain the arc. All of the heat utilized, however, to raise the weld metal or the arc temperature above that temperature at which the weld metal will properly coalesce, is in the present practice substantially all wasted. Not only is this excess heat itself wasted but the same causes a boiling and splattering of the weld metal leading to further dissipation of energy and a wastage of the metal itself.

It is, therefore, a principal object of this invention to provide a process of and a welding electrode for use in such process, characterized by the fact that a substantial portion of the heat normally wasted in conventional welding operations may be conserved and utilized not only for the production of a sounder weld metal deposit, but of equal, and perhaps greater importance, the deposition of a substantially greater amount of weld metal per unit of heat utilized in the arc.

Other objects of our invention will appear as the description proceeds:

To the accomplishment of the foregoing and related ends, said invention, then, consists of the means hereinafter fully described and particularly pointed out in the claims, the annexed drawing and the following description setting forth in detail certain means and modes of carrying out the invention, such disclosed means and modes illustrating, however, but several of the various ways in which the principle of the invention may be used.

Broadly stated, this invention comprises the process of electrodepositing metal by maintaining an arc between the work and a fusible electrode, and concurrently feeding into the arc additional weld metal by means of a member arranged coaxially with the arc, but insulated from that portion of the electrode on which the arc is maintained so that the heat normally wasted in the arc is utilized to melt down this additional component. The coaxial arrangement of the parts is such that the heat normally wasted in the manner indicated above is most efficiently conserved for the purpose of providing a maximum amount of weld metal with the minimum expenditure of heat energy.

Figure 1:
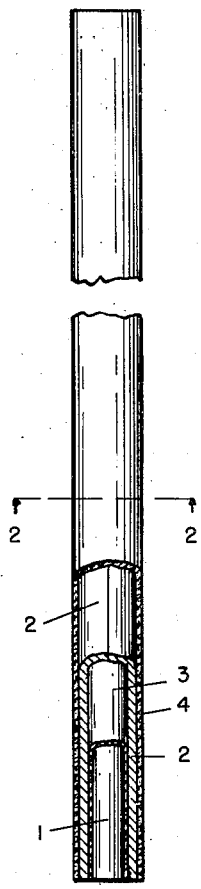
Fig. 1 is an elevational view partially in section of a welding electrode comprising one embodiment of this invention and useful in the method of welding of this invention.
Figure 2:
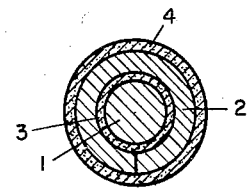
Fig. 2 is a transverse sectional view of the electrode of Fig. 1 taken on a plane substantially indicated by the line 2—2.

Referring now more specifically to the drawing and more especially to Figs. 1 and 2, the welding electrode here illustrated comprises a central fusible metallic core 1, and a concentrically arranged fusible metallic sheath 2. The core and sheath are electrically insulated from each other by means of a layer 3 which may be conveniently formed of conventional weldrod covering material so as to perform the dual function of an electrical insulator and weldrod covering.

The entire electrode is provided with a covering 4 of conventional weldrod covering material, the primary purpose of which is the same as that for which weldrod coverings are usually employed.

Figure 3:
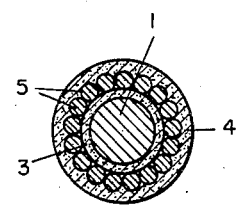
Fig. 3 is a transverse sectional view similar to Fig. 2 but showing an alternative form of construction.

Figs. 1 and 2 are illustrative of the generic form of the weldrod, and it will be obvious to those skilled in the art that numerous specific modifications and adaptations are possible. For example, the sheath 2 may be a seamless tube; or alternatively, it may be a tubular member formed by circularizing a flat blank; or alternatively, as illustrated in Fig. 3, the same may be formed of a plurality of separate elements such as wires 5 laid side-by-side longitudinally of the weldrod; or alternatively, a strip of fusible metal may be wound helically about the coating 3. Similarly the core 1 may be any form of composite structure which may be desired.

The essential feature of the weldrod is the fact that the same comprises a body having a plurality of longitudinally extending laterally adjacent components preferably arranged concentrically with respect to each other and electrically insulated from each other so that the welding arc may be maintained on one such component, and the normally wasted heat from such arc utilized to melt down the other component.

For certain purposes, it will be found desirable to maintain a certain proportional relationship between the cross-sectional areas of the elements 1 and 2 respectively. Usually for best results the arc will be maintained on the core member 1. When this is done, then the cross-sectional area of the element 2 may conveniently vary from one-half to four times the area of component 1. It will be found that best results will be secured by having the cross-sectional area of element 2 from one and one-half to two and one-half times the cross-sectional area of element 1.

The composition of elements 1 and 2 may be the same or different. Thus, for example, a mild steel core 1 may be utilized in combination with an alloy element 2 and vice versa.

The flux layers comprising components 3 and 4 of the weldrod body may be the same or different compositions, and may be applied by any of the known methods. The precise composition of the weldrod covering material comprising components 3 and 4 of the composite electrode is not critical. Any conventional weldrod covering material may be used.

It may be helpful, for a full understanding of this invention, to indicate relative dimensions for a composite weldrod which has been used with a considerable degree of success.

Component 1—
  Mild steel wire_____inch in diameter__ .250
Component 2—
  Mild steel wire_____inch thick__ .070
Component 3—
  Conventional weldrod covering____do____ .029
Component 4—
  Conventional weldrod covering____do____ .070

Cross-sectional area of component 2 is 1.58 times the cross-sectional area of component 1. Utilizing a welding current of 450 amperes with this electrode, weld metal was deposited at the rate of 31 pounds per hour.

The decided efficiencies which may be secured by the use of this invention will become apparent when the results, as outlined above, are compared with the fact that with a conventional ¼ inch shielded arc electrode operating at 450 amperes, the usual rate of depositing is 13 pounds per hour as compared with the 31 pounds per hour given above.

While the arc will generally be maintained on component 1, it may be desirable, for certain purposes, to maintain the arc on component 2. This is generally less desirable, however, because it is usually best to utilize a confined arc and one whose position on the end of the electrode may be accurately controlled. If the arc is maintained on the end of component 2, it will have a tendency to wander over the area of such component so that it is more difficult to control than when it is maintained on the end of the core.

Whichever metallic component of the weldrod is selected for purposes of maintaining the arc, some provision must be made for baring that component at the remote end of the weldrod so that an electrical connection may be established between it and the welding circuit. This is usually best accomplished by having that particular component projected axially from the remaining body of the weldrod, and by then clamping a suitable lead thereto.

While best results will generally be secured by utilizing a composite electrode structure of the character described in which the two fusible metallic components are arranged coaxially, and with the arc maintained on the end of the central component, nevertheless, for certain types of work, desirable results can be secured by utilizing a composite structure in which the two components are laterally contiguous although not concentric. Such a structure may be produced, for example, by utilizing two half-round rods placed with their flat faces toward each other, with a layer of electrically insulating material, such as weldrod covering material, therebetween, and then maintaining the arc from the end of only one of such components. When this is done, it will be desirable to operate the weldrod in such a way that a line drawn between the centers of the metallic components and the end of the weldrod is substantially parallel to the line along which the weldrod is to be moved.

With this arrangement, the arc may be maintained at either the forward or rear component. When such an arrangement is employed, it will be desirable to utilize an electro-magnet arranged coaxially with respect to the electrode, and energized so as to provide a directional effect on the blow of the arc, so that the arc maintained on the one component is blown toward the laterally contiguous fusible metallic component insulated therefrom.

From the foregoing, it will be observed that we have provided a method of welding and an electrode for use in conjunction therewith which makes possible the conservation and the efficient use of a substantial amount of the heat which is normally wasted in conventional arc welding operations.

Other modes of applying the principle of our invention may be employed instead of the one explained, change being made as regards the means and the steps herein disclosed, provided those stated by any of the following claims or their equivalent be employed.

We, therefore, particularly point out and distinctly claim as our invention:

1. In the process of metal working by electricity, the steps of providing an electrode, the body of which comprises a plurality of coaxially arranged fusible metallic components, each such component provided with a sheath of conventional weldrod covering, and maintaining an electric arc between the work and the inner one of said components.

2. In the process of metal working by electricity, the steps of providing an electrode, the body of which comprises a solid fusible metallic core, an electrically insulating substantially conventional weldrod coating on said core, a metallic sheath, having a cross-sectional area of from one-half to four times the cross-sectional area of said core around said coating and electrically insulated from said core and a weldrod coating on said sheath, and maintaining an electric arc between the work and the inner one of the metallic components of the electrode.

3. In the process of metal working by electricity, the steps of providing an electrode, the body of which comprises a solid fusible metallic core, an electrically insulating substantially conventional weldrod coating on said core, a metallic sheath of substantial thickness around said coating and electrically insulated from said core and a weldrod coating on said sheath, and maintaining an electric arc between the work and the core of said electrode.

JAMES F. LINCOLN.
THEOPHIL E. JERABEK.